Nov. 9, 1937.  F. C. BEST  2,098,224
MOTOR VEHICLE
Filed June 30, 1934  5 Sheets-Sheet 1
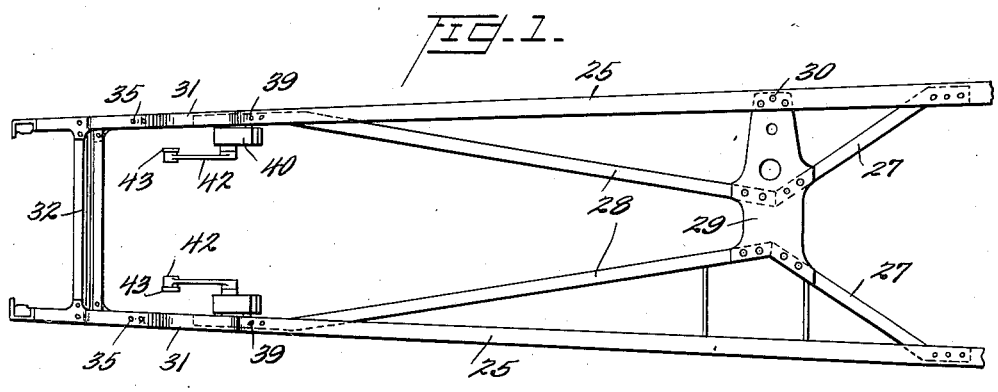
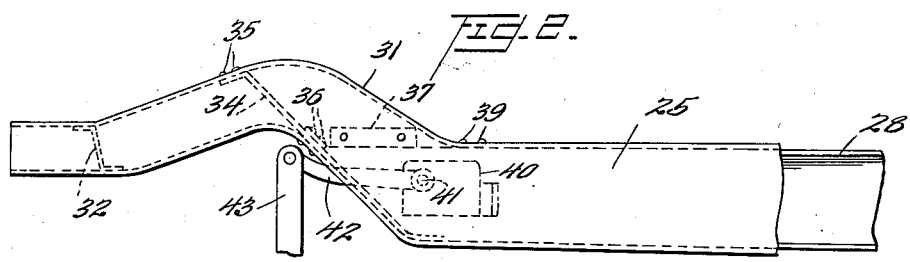
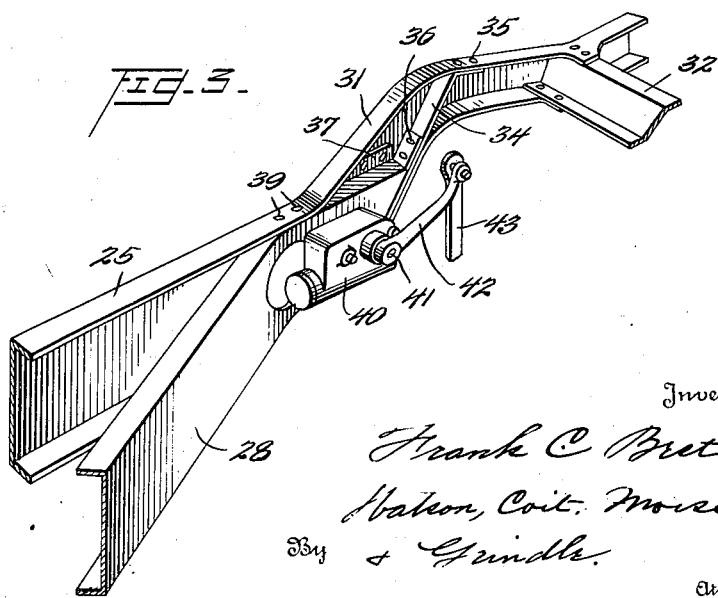
Inventor
Frank C. Best,
Watson, Coit, Morse
By  & Grindle.
Attorney Nov. 9, 1937.　　　　F. C. BEST　　　　2,098,224
MOTOR VEHICLE
Filed June 30, 1934　　　5 Sheets-Sheet 2
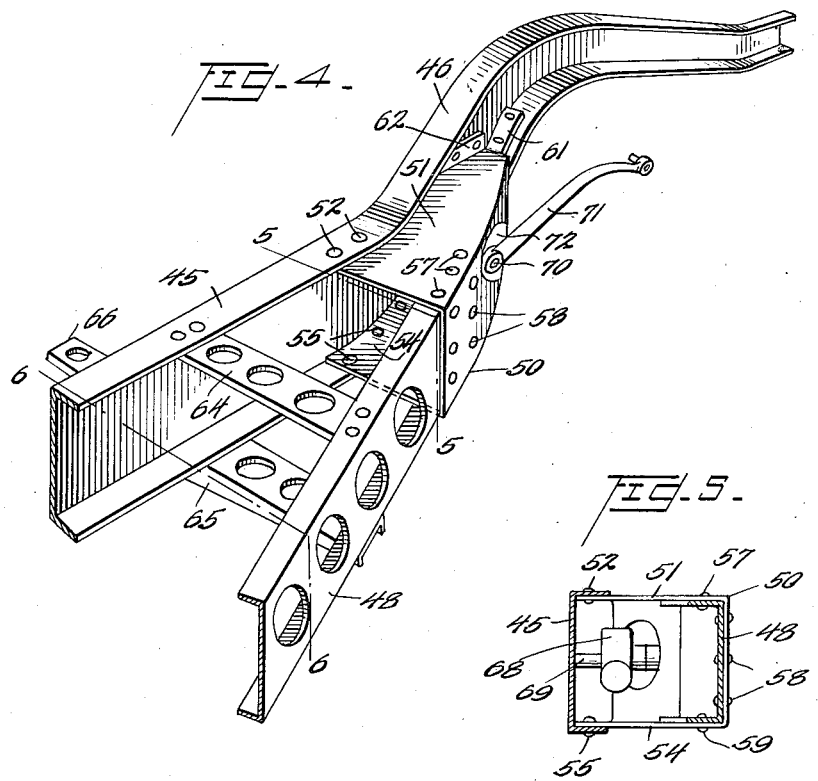
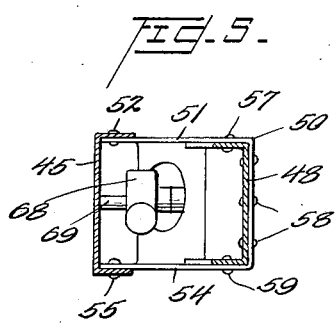
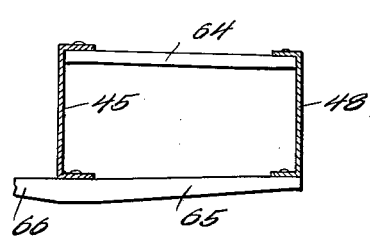
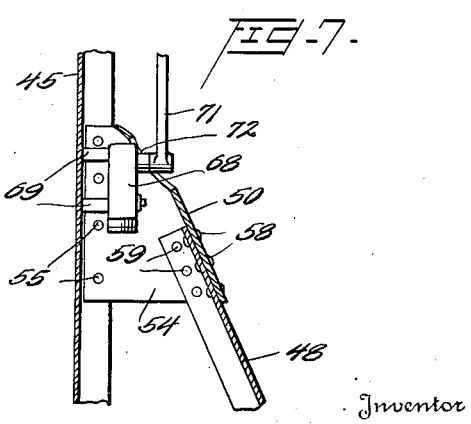
Inventor
Frank C. Best,
Watson, Coit, Morse
By & Grindle
Attorney Nov. 9, 1937.  F. C. BEST  2,098,224
MOTOR VEHICLE
Filed June 30, 1934    5 Sheets-Sheet 3
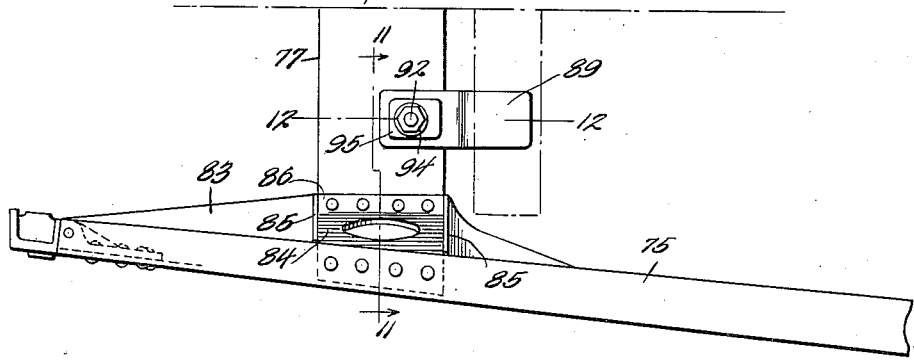
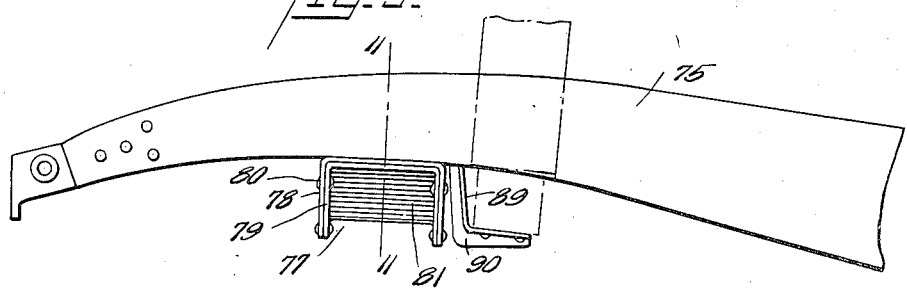
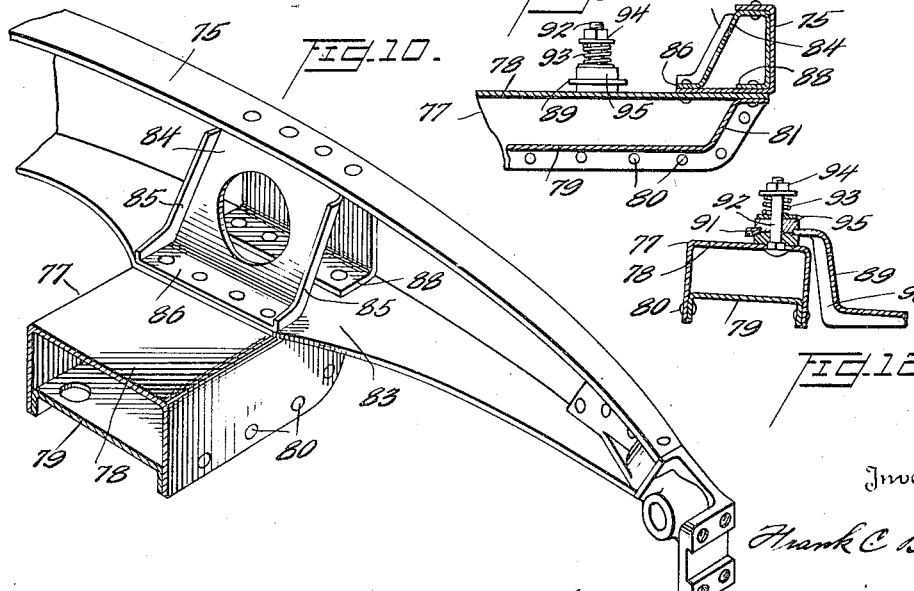
Inventor
Frank C. Best,
By Watson, Coit, Morse
& Grindle
Attorney

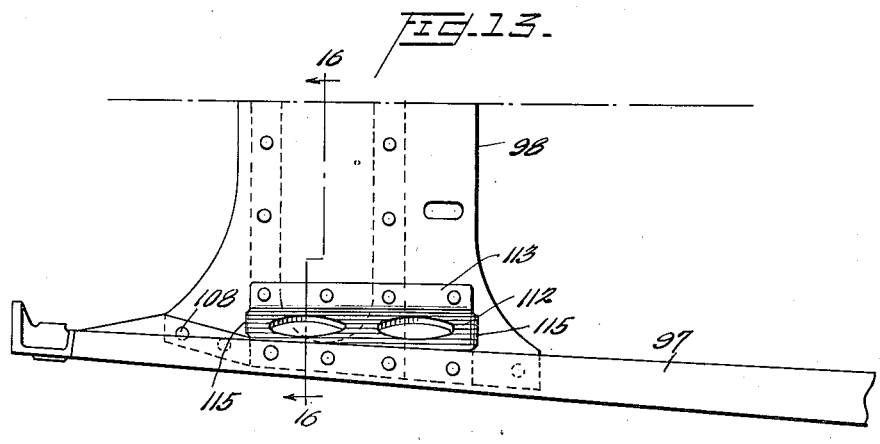
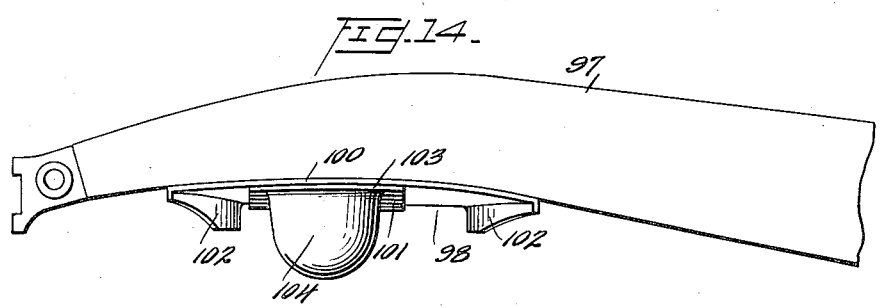
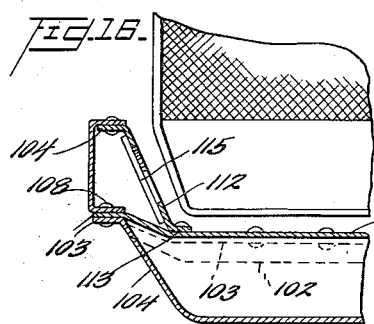
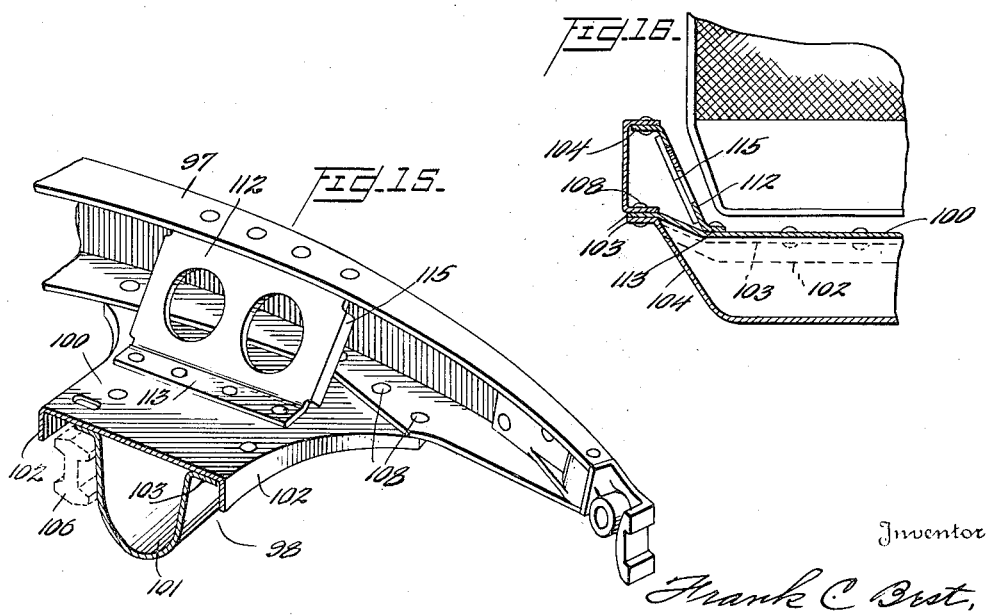

Nov. 9, 1937.    F. C. BEST    2,098,224
MOTOR VEHICLE
Filed June 30, 1934    5 Sheets-Sheet 5
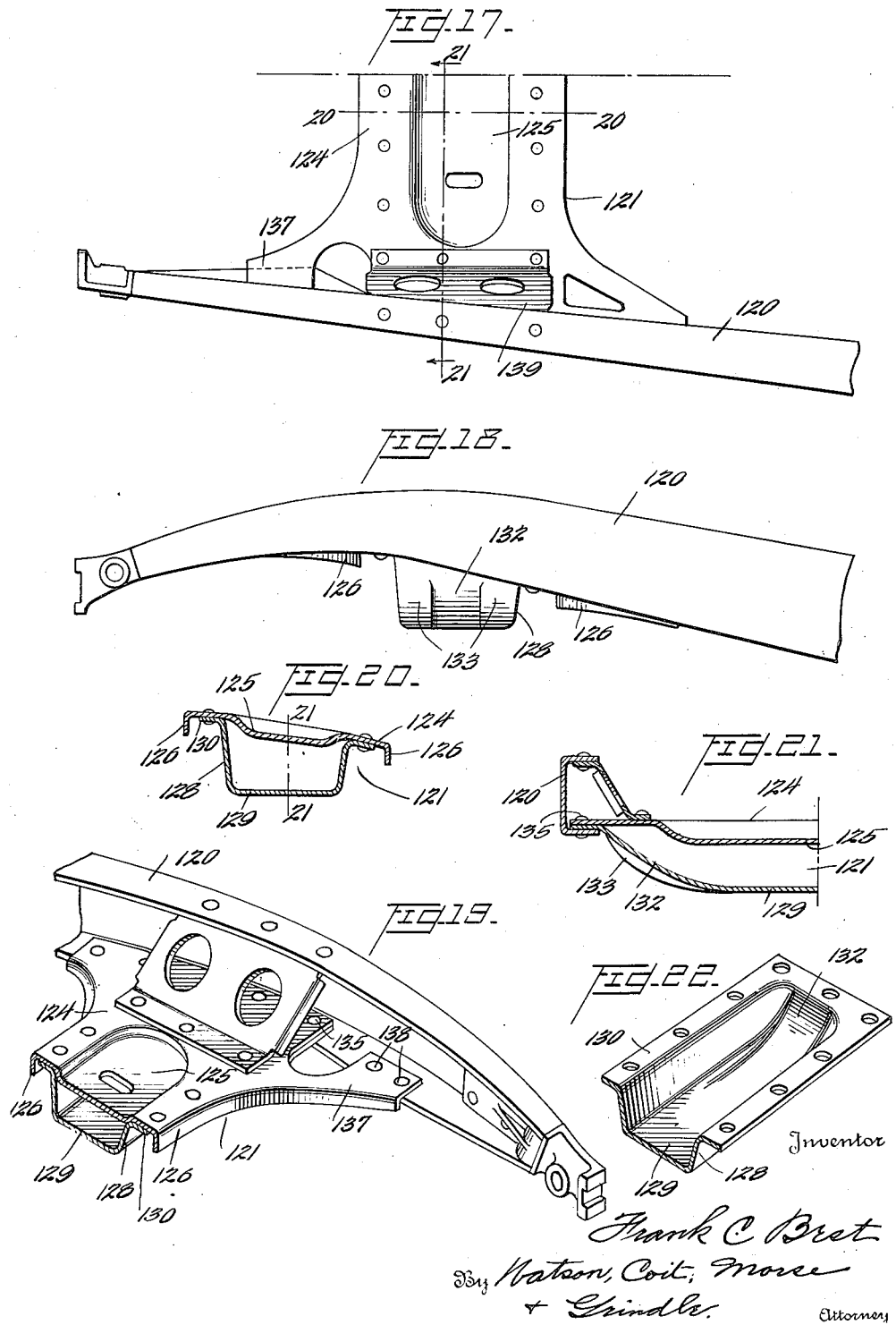

Patented Nov. 9, 1937

2,098,224

UNITED STATES PATENT OFFICE 2,098,224

MOTOR VEHICLE

Frank C. Best, Detroit, Mich., assignor to Packard Motor Car Company, Detroit, Mich., a corporation of Michigan Application June 30, 1934, Serial No. 733,317

9 Claims. (Cl. 280—106)

This invention relates to motor vehicles and more particularly to vehicle frame constructions. It is the principal object of the invention to provide a durable frame characterized by minimum weight and maximum rigidity, the component parts of the frame being so constructed and disposed as to substantially eliminate undesirable flexibility.

The demand for greater maximum speeds in motor vehicles has made necessary the development of vehicle frames of greatly increased rigidity, but in order that a vehicle may be accelerated and decelerated rapidly it is essential that the weight be not materially increased by alteration of the frame construction. Recent developments in motor vehicle design have further necessitated the provision of vehicle frames of much greater stiffness and resistance to weaving; for instance, the vehicle motor formerly constituted in effect a portion of the frame and served to rigidly connect the usual sills or side frame members, but the additional strength afforded by this arrangement has been largely eliminated by the provision of yielding supports for the motor. Again, the adoption of independent springing has necessitated the development of new frame designs particularly suited to accommodate the wheel suspension structure.

It is therefore an object of the invention to provide means for connecting the side frame members of a vehicle frame of sufficient strength to adequately resist the various forces tending to distort the frame laterally, longitudinally, vertically, and torsionally without substantial increase in the weight of the frame.

It is a further object of the invention to provide a vehicle frame comprising an X frame structure which is so secured to the side frame members as to properly distribute the load thereon and to effect substantial reinforcement of the side frame members, particularly when the latter are weakened by curving the same for the purpose of accommodating wheel suspension constructions departing from prior conventional practice in this country.

It is a more specific object of the invention to increase materially the stiffness of the forward portion of the frame and to provide adequate and convenient support for shock absorbing mechanism associated with the wheel suspension.

Further objects and features of the invention will be apparent from the following description taken in connection with the accompanying drawings, in which Figure 1 is a plan view of a portion of a motor vehicle frame illustrating the present invention;

Figure 2 is a side elevation on a larger scale of a portion of the frame shown in Figure 1;

Figure 3 is a fragmentary perspective view of the structure shown in Figure 2;

Figure 4 is a fragmentary perspective view of a slightly modified form of the invention;

Figure 5 is a sectional view on the line 5—5 of Figure 4;

Figure 6 is a sectional view on the line 6—6 of Figure 4;

Figure 7 is a fragmentary sectional view of the structure shown in Figure 4 taken on a generally horizontal plane;

Figure 8 is a view in plan of the forward end of one side of the vehicle frame illustrating a modified form of the invention;

Figure 9 is a side elevation of the construction shown in Figure 8;

Figure 10 is a view in perspective of the structure shown in Figures 8 and 9;

Figure 11 is a fragmentary sectional view taken substantially on the line 11—11 of Figure 9;

Figure 12 is a sectional view taken on the line 12—12 of Figure 8;

Figure 13 is a plan view of one side of the forward end of the vehicle frame illustrating a further modification of the invention;

Figure 14 is a side elevation of the arrangement shown in Figure 13;

Figure 15 is a perspective view of the construction shown in Figures 13 and 14;

Figure 16 is a sectional view taken substantially on the line 16—16 of Figure 13;

Figure 17 is a plan view of the forward end of one side of the vehicle frame illustrating a further modification;

Figure 18 is a side elevation of the construction shown in Figure 17;

Figure 19 is a view in perspective of the arrangement shown in Figures 17 and 18;

Figure 20 is a sectional view taken substantially on the line 20—20 of Figure 17;

Figure 21 is a sectional view taken on the line 21—21 of Figure 20; and

Figure 22 is a view in perspective of a component element of the frame shown in Figures 17 to 21 inclusive.

For convenience in describing the invention and to facilitate an understanding of the principles thereof, detailed language will be employed with reference to the preferred embodiments of the invention illustrated in the drawings. It will nevertheless be understood that no restriction of the scope of the invention is thereby intended and that various modifications and alterations are contemplated such as would fall within the province of one skilled in the art.

Dealing first with the form of the invention shown in Figures 1 to 3 inclusive of the drawings, it will be observed that the usual sills or side frame members 25 are connected by a reinforcing X frame structure comprising rearwardly directed members 27 and forwardly directed members 28, these members being inclined at acute angles with respect to the side frame members 25 and being united, preferably to the rear of the central portion of the frame as measured longitudinally, by anchor plates 29 disposed above and below the members 27 and 28 and riveted thereto, the plates 29 being preferably extended for engagement with and rigid attachment to one of the side frame members as at 30. Preferably the members 27 and 28 are of channel section having the flanges thereof directed outwardly or toward the adjacent side frame member. The precise details of the X frame structure as thus far described constitute no essential part of the present invention and this structure may assume other forms, the invention dealing more particularly with the manner in which the forwardly extending members 28 of the X frame structure are secured to the side frame members and to the structure and mode of reinforcement of the side frame members forwardly of the X frame structure.

Thus as shown more particularly in Figures 2 and 3, each side frame member 25 may be formed of channel section with the flanges directed inwardly, and the forwardly extending members 28 of the X frame structure are received within and serve to close a portion of the open side of each side frame member 25.

It will be observed that immediately forwardly of the junction of the members 28 and 25, the latter are deflected or curved upwardly as indicated at 31, the members 25 at opposite sides of the vehicle being connected by a transversely extending cross frame member 32 which is rigidly secured to each of the side frame members forwardly of the upwardly curved portion 31 thereof. While any upward curvature of the side frame members tends to reduce the strength and rigidity thereof, this is a desirable arrangement for some purposes. For instance, when an independent wheel suspension employing coil springs is used, it is advisable to locate these springs substantially in the vertical planes of the side frame members and the upward deflection of the latter permits the employment of springs of sufficient length directly beneath the side frame members. In order that this arrangement may result in no decrease in the rigidity or strength of the side frame members, a construction such as that shown in the drawings may be employed.

Thus the base portion of the forwardly extending member 28 may conform substantially at its forward end to the contour of the lower flange of the side frame member 25 at the point of upward deflection of the latter, the lower flange of the member 28 being bent to incline upwardly along and in engagement with the lower flange of the member 25. Preferably the lower flange of the member 28 is continued in an upward inclined direction as indicated at 34 and is secured as at 35 to the upper flange of the side frame member 25. Similarly the upper flange of the member 28 is extended beyond the base of the latter and is inclined upwardly along the lower flange 34, being secured to the latter and to the lower flange of the side frame member 25 by rivets 36 or the like. The upper flange of the member 28 may further be provided with an upwardly directed extension 37 which may be secured to the base of the side frame member 25. At the junction of the members 28 and 25, the corresponding flanges of these members are further rigidly secured together as indicated at 39.

It will be observed that by this construction the frame is rendered even more rigid than if no upward deflection of the side frame members were resorted to, the upper and lower flanges of the side frame members being adequately braced and reinforced to strengthen these members at the point which would be otherwise inherently weak.

A shock absorbing mechanism 40, the details whereof constitute no part of the present invention, may be secured to the base of the forwardly extending member 28 adjacent the points of connection of the latter to the side frame member so that any stresses applied to the shock absorbing mechanism are adequately resisted. This mechanism may comprise the usual inwardly directed actuating shaft 41 to which is secured the arm 42, the latter being coupled by means of a link 43 or the like to a convenient one of the movable members of the wheel suspension system.

Referring now to the form of the invention shown in Figures 4 to 7 inclusive, it will be observed that the side frame members 45 are curved upwardly adjacent their forward ends as indicated at 46. The construction may be similar to that shown in the first described form of the invention, the illustration of the entire X frame structure being omitted to simplify the disclosure, only the forward end of one of the forwardly extending members 48 of the X frame structure being shown. As illustrated more particularly in Figure 7, the member 48 is not engaged with and directly secured to the side frame member 45, a structural element 50 being employed. This element is preferably generally U-shaped, the upper leg 51 of the element being secured to the upper flange of the side frame member 45 as indicated at 52 and the lower leg 54 of the element being secured to the lower flange of the side frame member 45 as indicated at 55. The element 50 preferably embraces the forwardly extending member 48 and engages the three outer sides thereof, being riveted or otherwise secured to the upper flange of the member 48 as indicated at 57, to the base of the member 48 as indicated at 58, and to the lower flange of the member 48 as indicated at 59. If desired the member 48 may be carried forward and directly united with the side frame member 45, but the preferred embodiment of the invention is that illustrated in the drawings.

The lower leg 54 of the element 50 is preferably shaped to conform to the upwardly curved portion of the lower flange of the side frame member 45 and is secured thereto along its entire length. The upper leg 51 of the element 50 is extended as indicated at 61 and is secured to the lower flange of the side frame member 45 near the forward end of the upwardly curved portion of the latter. The leg 51 of the element 50 may be further provided with an upwardly directed flange 62 which may be secured to the base of the side frame member 45.

It will be observed that the structure thus described is similar to that shown in Figures 1 to 3 inclusive in several respects. Thus in each of these two forms of the invention the side frame member is curved upwardly and an element which is either formed integrally with or is rigidly secured to the forwardly extending member of the X frame structure is disposed substantially in a horizontal plane and is secured rigidly to both the upper and lower flanges of the side frame member so as to substantially bridge the curved portion thereof. This construction ensures maximum rigidity with minimum weight and adequately reinforces the curved portion of the side frame member. As an additional reinforcement it is proposed to provide a brace member 64 secured to and extending between the upper flanges of the members 45 and 48 and a brace member 65, preferably of channel section, secured to the lower flanges of the members 45 and 48. If desired the member 65 may be extended outwardly of the side frame member 45 as indicated at 66 to provide a support for the fender or running board of the vehicle.

In the form of the invention shown in Figures 4 to 7, the element 50 provides a housing within which a shock absorber may be conveniently located. Thus shock absorbing mechanism 68 may be secured as indicated at 69 to the side frame member or may be otherwise supported within the housing 50, the usual actuating shaft 70 of the shock absorber extending through an opening 72 in the housing 50, the arm 71 being secured to the shaft 70 and connected in any convenient manner with an axle or supporting link of the wheel suspension. By means of this construction the shock absorbing mechanism is adequately protected against damage and at the same time may be readily removed for inspection or repair.

Dealing now with the form of the invention shown in Figures 8 to 12 inclusive of the drawings, it will be observed that the side frame members 75, which may be reinforced if desired by an X frame structure such as shown in the preceding forms of the invention, are rigidly connected by means of a cross frame member 77 which is characterized by extreme rigidity and which is at the same time light and inexpensive to construct. Thus the cross frame member 77 preferably comprises a closed box structure including an upper member 78 of channel section, the flanges of this member being directed downwardly and the base portion being substantially flat. The lower member 79 is also preferably of channel section of much less depth, the flanges of the members 78 and 79 being rigidly secured together as indicated at 80. As shown more particularly in Figure 11 of the drawings, the lower member 79 is deflected upwardly at each end as indicated at 81 and is provided with an outwardly directed flange 82 which is engaged with and secured to the base portion of the member 78.

Adjacent the cross frame member 77 the lower flange of the side frame member 75 is widened to a considerable extent to provide an inwardly directed portion 83 with which the base of the member 78 directly engages. A shear and torsion resisting element is associated with each side frame member at this point, this element comprising an inclined portion 84 having stiffening flanges 85 at the sides thereof and a flange 86 which is directly secured to the enlarged portion 83 of the side frame member and to the base of the member 78 by means of bolts or rivets passing therethrough. The element is further extended to engage and fit snugly within the inner faces of the side frame member, terminating in an inwardly directed flange 88 which is secured to the lower leg of the side frame member and to the base of the member 78 and the flange 82 at the outer end of the upwardly directed portion 81 of the member 79, the element being also attached to the upper flange of the side frame member and to the base thereof if necessary.

The inherent strength of this arrangement will be readily appreciated, the structure and location of the several parts obviously contributing to produce an extremely rigid frame highly resistant to weaving without material increase in weight.

The cross frame member 77 is preferably located immediately forward of the radiator shell which is indicated in dotted lines in Figures 8 and 9, the radiator shell being therefore conveniently supported on the cross frame member. For this purpose radiator supporting brackets 89 may be employed, one of these being disposed at either side of the center line of the vehicle, each bracket being preferably shaped as shown and provided with a reinforcing rib 90. The forward leg of each bracket is provided with an opening 91, and a bolt 92 passing through an aperture in the member 78 and through the opening in the bracket is surrounded by a coil spring 93. The spring 93 is retained on the bolt by means of a nut and washer 94 and is compressed thereby against the upper of two disks 95 which surround the bolt 92 and respectively engage the upper and lower faces of the bracket 89 to clamp the latter yieldingly therebetween.

By means of this construction the radiator shell is permitted slight displacement with respect to the points of support therefor on the cross frame member so that the application of undue stresses to the radiator is avoided and the transmission of vibrations thereto is reduced.

The form of the invention shown in Figures 13 to 16 inclusive is somewhat similar to that disclosed in Figures 8 to 12. Thus the side frame members 97 are connected by means of a cross frame member 98, the latter comprising an upper, substantially flat member 100 having downwardly extending flanges 102 at either side thereof, and a lower dished member 101, these two members being secured together to form a substantially closed box structure. In this form of the invention the member 101 is substantially U-shaped in cross-section and curves gradually from one leg to the other, each leg terminating in a flange 103 which is preferably continuous and defines the upper periphery of the member, each end of the member 101 being deflected upwardly as indicated at 104. The continuous flange 103 is preferably in engagement substantially throughout its entire length with and is secured rigidly to the upper member 100, the member 100 being of considerably greater width than the member 101, whereby space is provided at one side of the member 101 in which a transversely extending axle 106 may lie, it being observed that the member 100 extends over the axle and thus serves to limit upward movement of the latter. Thus under unusual circumstances, for instance the breakage of the vehicle springs, the vehicle frame will be supported directly on the axle and the road wheels and displacement of either end of the axle longitudinally of the vehicle under such conditions will be prevented.

The cross frame member engages and is secured to the lower flange of the side frame member 97, for instance by means of rivets 108 which extend through the member 100 and through the flange 103 of the member 101 as shown more particularly in Figure 16. Means similar to that described in connection with Figures 8 to 12 inclusive may be provided for supporting the radiator shell 109 on the cross frame member.

In order that the extreme rigidity afforded by the unusual construction of the cross frame member may be utilized to the fullest extent, the connection of this member with the side frame member 97 is strengthened by means of an inclined structural element 112 having a flange 113 rigidly secured to the member 100 and a flange 114 rigidly secured to the upper flange of the side frame member 97, lateral flanges 115 being provided to strengthen the element.

In Figures 17 to 22 inclusive a further modification of the invention is disclosed, the construction including side frame members 120 which are connected by a cross frame member 121 characterized by maximum rigidity and light weight. This cross frame member comprises an upper member 124 which is substantially flat but which is provided with a slightly dished portion 125 to afford added strength, and provided with lateral downwardly directed flanges 126. A lower member 128 having a dished portion 129 and a continuous peripheral flange 130 is secured to the member 124 throughout the length of the flange to form a closed box structure. Preferably the upwardly curved part 132 of the dished portion 129 of the member 128 is so shaped as to provide ribs 133 as shown more particularly in Figures 21 and 22 of the drawings, it being observed that the construction of this cross member is of such a nature as to adequately resist all stresses which may be applied thereto during operation of the vehicle.

The outer ends of the flange 130 of the member 128 and the member 124 are secured together and to the lower flange of the side frame member 120 as indicated at 135, and a forward extension 137 of the member 124 is also secured to the lower flange of the side frame member as indicated at 138.

The connection between the cross frame member 121 and the side frame member 120 is further reinforced by means of an inclined element 139 in the form of a flanged plate, the construction being similar to that disclosed in the embodiment of the invention described immediately hereinbefore.

It will be observed from the drawings that the members of the frame are provided with apertures at suitable points to reduce the weight without unduly weakening the frame structure, and while these apertures have not been specifically described, it will be understood that they constitute a part of although by no means an essential feature of the invention. The various component parts of the several forms of the invention illustrated herein are to a large extent interchangeable; thus it is proposed to employ an X frame structure such as illustrated in Figures 1 to 7 inclusive of the drawings in combination with the cross frame structure shown in Figures 8 to 22 inclusive of the drawings, suitable changes necessary to effect this combination being contemplated.

Having thus described the invention, what is claimed as new and desired to be secured by Letters Patent is:

1. In a motor vehicle frame, the combination with side frame members of channel section having the flanges thereof directed inwardly, of an X frame structure connecting said side frame members, said X frame structure including forwardly extended members forming an acute angle with said side frame members, and generally U-shaped members having the legs thereof secured to the respective flanges of said side frame members and having the bases thereof engaging and secured to the members of said X frame structure.

2. In a motor vehicle frame, the combination with side frame members of channel section, of an X frame structure connecting said side frame members, said X frame structure including forwardly extended members forming an acute angle with said side frame members, and members having both ends secured to each side frame member and passing about the associated member of the X frame structure.

3. In a motor vehicle frame, the combination with side frame members of channel section, of an X frame structure connecting said side frame members, said X frame structure including forwardly extended members forming an acute angle with said side frame members, members secured to each side frame member and embracing the associated member of the X frame structure, and shock absorbers housed within each of said last named members.

4. In a motor vehicle frame, the combination with side frame members of channel section having the flanges thereof directed inwardly, of an X frame structure connecting said side frame members, said X frame structure including forwardly extended members forming an acute angle with said side frame members, generally U-shaped members having the legs thereof secured to the respective flanges of said side frame members and having the bases thereof engaging and secured to the members of said X frame structure, and brace members disposed rearwardly of said U-shaped members and secured between each flange of the respective side frame member and the adjacent member of the X frame structure.

5. In a motor vehicle frame, the combination with side frame members of channel section, each side frame member being curved upwardly adjacent the forward ends thereof, of an X frame structure connecting said side frame members, said X frame structure including forwardly extended members forming an acute angle with said side frame members, and members having both ends secured to each side frame member and passing about the associated member of the X frame structure adjacent the upwardly curved portions of the side frame members.

6. In a motor vehicle frame, the combination with side frame members of channel section having the flanges thereof directed inwardly and having upwardly curved portions adjacent the forward ends thereof, an X frame structure connecting said side frame members and having forwardly directed members forming acute angles with the respective side frame members, said forwardly directed members being of channel section with the flanges of each directed outwardly, and means securing each of said forwardly directed members to the adjacent side frame member adjacent the upwardly curved portion of the latter, said means including a structural element rigid with each forwardly directed member and having an upper flange portion lying substantially in the plane of the upper flange of the side frame member and secured to the latter and to the lower flange of the side frame member so as to bridge the major part of the upwardly curved portion of the side frame member, said structural element being integral with and forming a continuation of the associated forwardly directed member.

7. In a motor vehicle frame, the combination with side frame members of channel section having the flanges thereof directed inwardly and having upwardly curved portions adjacent the forward ends thereof, an X frame structure connecting said side frame members and having forwardly directed members forming acute angles with the respective side frame members, said forwardly directed members being of channel section with the flanges of each directed outwardly, the forward portions of said forwardly directed members fitting within and closing the adjacent side frame members, the lower flange of each forwardly directed member being inclined upwardly along the upwardly curved portion of the lower flange of the adjacent side frame member and being continued upwardly to engage with and be secured to the upper flange of said side frame member.

8. In a motor vehicle frame, the combination with side frame members of channel section having the flanges thereof directed inwardly and having upwardly curved portions adjacent the forward ends thereof, an X frame structure connecting said side frame members and having forwardly directed members forming acute angles with the respective side frame members, said forwardly directed members being of channel section with the flanges of each directed outwardly, and means securing each of said forwardly directed members to the adjacent side frame member adjacent the upwardly curved portion of the latter, said means including a structural element rigid with each forwardly directed member and having an upper flange portion lying substantially in the plane of the upper flange of the side frame member and secured to the latter and to the lower flange of the side frame member so as to bridge the major part of the upwardly curved portion of the side frame member.

9. In a motor vehicle frame, the combination with side frame members of channel section having the flanges thereof directed inwardly and having upwardly curved portions adjacent the forward ends thereof, an X frame structure connecting said side frame members and having forwardly directed members forming acute angles with the respective side frame members, said forwardly directed members being of channel section with the flanges of each directed outwardly, and means securing each of said forwardly directed members to the adjacent side frame member adjacent the upwardly curved portion of the latter, said means including a structural element rigid with each forwardly directed member and having an upper flange portion lying substantially in the plane of the upper flange of the side frame member and secured to the latter and to the lower flange of the side frame member so as to bridge the major part of the upwardly curved portion of the side frame member, and shock absorbing mechanism supported by said frame in close proximity to said structural element.

FRANK C. BEST.